(No Model.)

W. M. MASON.

DEVICE FOR CUTTING THE RUNNERS OF STRAWBERRY VINES.

No. 331,804. Patented Dec. 8, 1885.

WITNESSES:
C. A. Creston
C. W. Russell

INVENTOR:
William M. Mason
Roscoe B. Wheeler
atty

UNITED STATES PATENT OFFICE.

WILLIAM M. MASON, OF WAUSEON, ASSIGNOR OF ONE-HALF TO EBENEZER ROSS, OF TOLEDO, OHIO.

DEVICE FOR CUTTING THE RUNNERS OF STRAWBERRY-VINES.

SPECIFICATION forming part of Letters Patent No. 331,804, dated December 8, 1885.

Application filed July 20, 1885. Serial No. 172,101. (No model.)

*To all whom it may concern:*

Be it known that I, WILLIAM M. MASON, a citizen of the United States, residing at Wauseon, in the county of Fulton and State of Ohio, have invented certain new and useful Improvements in Devices for Cutting the Runners of Strawberry-Vines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My present invention is designed for the purpose of cutting the runners or branching vines of strawberry-plants; and my invention consists in the arrangement of parts as hereinafter set forth, and pointed out in the claims.

Figure 1:
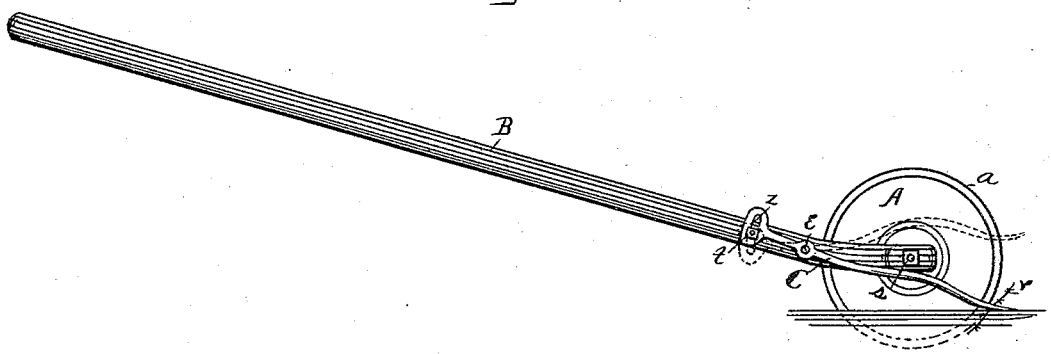
Figure 2:
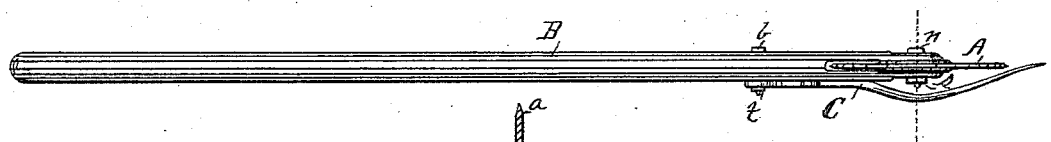
Figure 3:
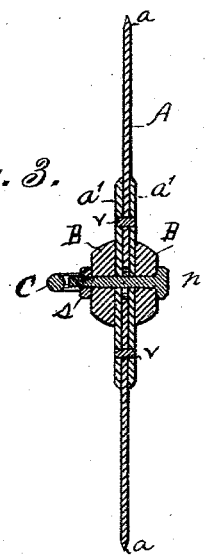

In the drawings forming a part of this specification, Figure 1 is a side elevation of the device embodying my invention. Fig. 2 is a top plan of same. Fig. 3 is an enlarged section on dotted line of Fig. 2.

In the drawings, B is the handle, which is slightly curved at the bottom, the lower end being forked, within which I locate the cutting disk or wheel A, the periphery $a$ being sharpened. The center of the wheel is strengthened on each side by the plates $a'$ $a'$, which are secured to the wheel A by the screws or rivets $v$ $v$. The wheel revolves upon a bearing within the forks of the handle by means of the bolt $n$, which passes through the handle and wheel, as shown in Figs. 2 and 3, being secured by the nut $s$. I attach to the sides of the handle a guard, C, being pivoted to the handle at $e$. The upper end of the guard is provided with a slot, $z$. Passing through the handle and slot is a bolt, $b$, having a nut, $t$, on one end. The guard extends outward from the wheel and forward, its free end being in advance of the wheel, as shown in Figs. 1 and 2. This is designed for a hand-tool, and is operated as follows: Grasping the handle and pressing forward, the wheel A is caused to revolve, cutting into the soil. The machine is driven along the side of a row of plants. The guard C being adjustable upon the handle B, it may be so set that when using the device the forward or free end of the guard will pass over the soil and runners $r$ of the plants, lifting up and turning from the wheel the dead leaves, also the overhanging leaves of the plants, leaving a clean path for the cutting-wheel, so as to enable it to cut into the soil and to sever the runners as it passes over them.

It will be observed that when the machine is operated by a tall person the free end of the guard must be thrown up, so as not to penetrate the soil, and when used by a child or short person, the free end of the guard should be lowered, all of which adjustments are obtained by loosening the nut $t$ and moving the upper end of the guard until the free end is at the desired point, when the nut $t$ is tightened and the machine is ready to do its work. By this arrangement the runners of strawberry-plants can be rapidly and neatly cut, thus lessening the expense over the present way of trimming the plants by means of shears or a knife.

Having thus fully set forth my present invention, what I claim as new, and desire to secure by Letters Patent, is—

1. In a device for cutting runners of strawberry-vines, the combination of the handle, the cutting-disk journaled thereon and adapted to penetrate the soil, and a guard attached to said handle, extending along the side and in advance of said cutting-disk, substantially as specified.

2. The combination of the handle B, the cutting-disk A, journaled on the handle, the guard C, pivoted at $e$ to the handle, and the means for adjusting the guard, as and for the purposes set forth.

In testimony whereof I affix my signature in presence of two witnesses.

WILLIAM M. MASON.

Witnesses:
CHAS. F. GREENOUGH,
L. W. WILLIAMS.